US009308608B2

(12) United States Patent
Townsend et al.

(10) Patent No.: US 9,308,608 B2
(45) Date of Patent: Apr. 12, 2016

(54) MAGNETIC INSTALLATION AND RETRIEVAL TOOL FOR FLUID LIFT PLUNGERS

(75) Inventors: Murray Ray Townsend, Edmonton (CA); Cal Whibbs, Calgary (CA)

(73) Assignee: Fourth Dimension Designs, Ltd., Edmonton (CA)

( * ) Notice: Subject to any disclaimer, the term of this patent is extended or adjusted under 35 U.S.C. 154(b) by 0 days.

(21) Appl. No.: 14/383,722

(22) PCT Filed: Mar. 8, 2012

(86) PCT No.: PCT/CA2012/000202
§ 371 (c)(1),
(2), (4) Date: Sep. 8, 2014

(87) PCT Pub. No.: WO2013/131165
PCT Pub. Date: Sep. 12, 2013

(65) Prior Publication Data
US 2015/0020381 A1    Jan. 22, 2015

(51) Int. Cl.
*E21B 33/068* (2006.01)
*B23P 19/04* (2006.01)
*E21B 43/12* (2006.01)

(52) U.S. Cl.
CPC ............. *B23P 19/04* (2013.01); *E21B 33/068* (2013.01); *E21B 43/12* (2013.01); *Y10T 29/53* (2015.01)

(58) Field of Classification Search
CPC .... B25B 11/002; B25J 15/0608; E21B 31/06; E21B 23/00; H01F 2007/208; H01F 7/206; Y10T 29/53
USPC ................. 269/8; 29/255; 294/65.5; 335/285
See application file for complete search history.

(56) References Cited

U.S. PATENT DOCUMENTS

| 2,828,762 | A | * | 4/1958 | Swank | 137/371 |
| 2,976,075 | A | * | 3/1961 | Budreck | 294/65.5 |
| 3,032,363 | A | * | 5/1962 | Clayborne | 294/65.5 |
| 3,771,084 | A | * | 11/1973 | Thon | 335/285 |
| 4,575,143 | A | * | 3/1986 | Nast | 294/65.5 |
| 4,813,729 | A | * | 3/1989 | Speckhart | 294/65.5 |
| 5,265,887 | A | * | 11/1993 | Stelmach | 294/65.5 |
| 5,433,492 | A | * | 7/1995 | Glossop, Jr. | 294/65.5 |
| 5,799,999 | A | * | 9/1998 | Schneider et al. | 294/65.5 |
| 5,826,928 | A | * | 10/1998 | Shang | 294/24 |

(Continued)

FOREIGN PATENT DOCUMENTS

GB    2390750 A    1/2004

*Primary Examiner* — Lee D Wilson
*Assistant Examiner* — Jamal Daniel
(74) *Attorney, Agent, or Firm* — Davis & Bujold PLLC; Michael J. Bujold

(57) ABSTRACT

A plunger installation and retrieval tool that incorporates a magnet which magnetically supports a fluid lift plunger during insertion into or retrieval from a lubricator on a natural gas wellhead. The magnet is housed in a magnet holder suspended from an elongate hanger member the upper end of which is connect to a hanger support. An actuation rod slidably extends through the hanger support and through bores in the magnet and magnet holder, such that a downward force applied to the actuating rod will cause the lower end of the actuation rod to project below the magnet and break its magnetic bond with the plunger, thus releasing the plunger from the tool. The tool may be provided with a cylindrical skirt fitting closely around the upper end of the plunger to prevent laterally leading that could break the magnetic bond during plunger insertion and retrieval.

14 Claims, 4 Drawing Sheets

(56) References Cited

U.S. PATENT DOCUMENTS

| | | | |
|---|---|---|---|
| 5,999,074 A * | 12/1999 | Coleman et al. | 335/285 |
| 6,148,923 A | 11/2000 | Casey | |
| 6,315,340 B1 * | 11/2001 | Chen | 294/24 |
| 6,321,626 B1 * | 11/2001 | Liu | 81/451 |
| 6,392,517 B1 * | 5/2002 | Coleman et al. | 335/285 |
| 6,666,115 B2 * | 12/2003 | Liu | 81/451 |
| 6,677,845 B1 * | 1/2004 | Fader et al. | 335/285 |
| 6,705,404 B2 | 3/2004 | Bosley | |
| D506,369 S * | 6/2005 | Norton | D8/14 |
| 7,378,928 B2 * | 5/2008 | Chang | 335/285 |
| 8,104,806 B1 * | 1/2012 | Shih | 294/24 |
| 9,010,444 B2 * | 4/2015 | Quitberg | 166/381 |
| 2004/0012215 A1 * | 1/2004 | Chang | 294/65.5 |
| 2004/0070224 A1 * | 4/2004 | Nurmi | 294/65.5 |
| 2005/0017526 A1 * | 1/2005 | Arrotta | 294/65.5 |
| 2005/0200143 A1 * | 9/2005 | Maestas | 294/65.5 |
| 2006/0279390 A1 * | 12/2006 | Chang | 335/285 |
| 2007/0132256 A1 * | 6/2007 | Parris et al. | 294/65.5 |
| 2014/0151019 A1 * | 6/2014 | Gano | 166/66.5 |

* cited by examiner

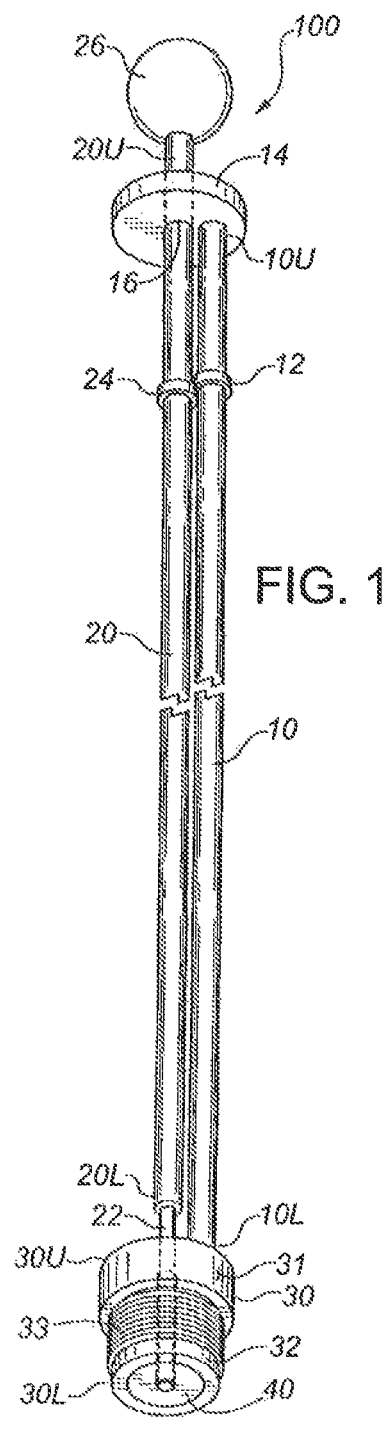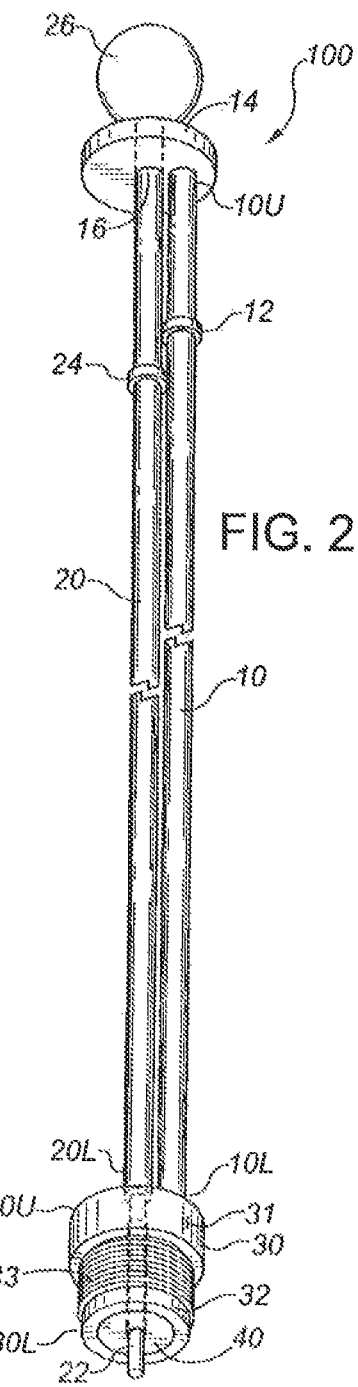

FIG. 3
FIG. 4
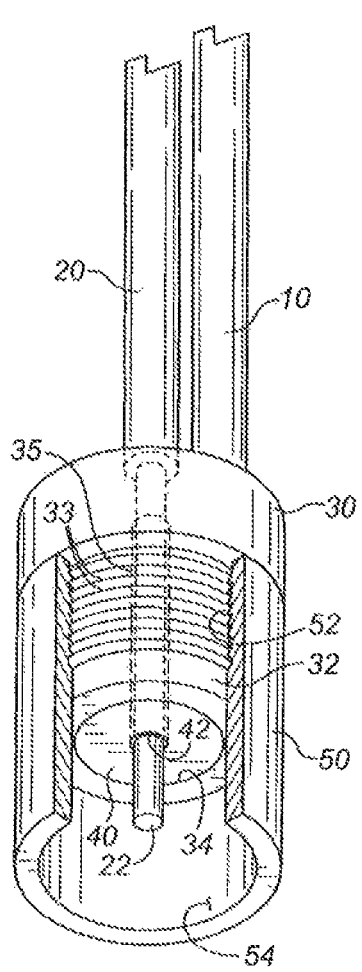
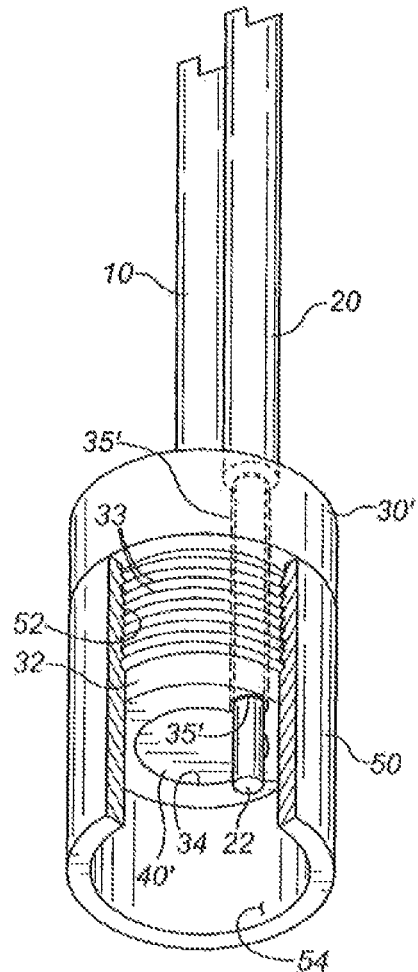

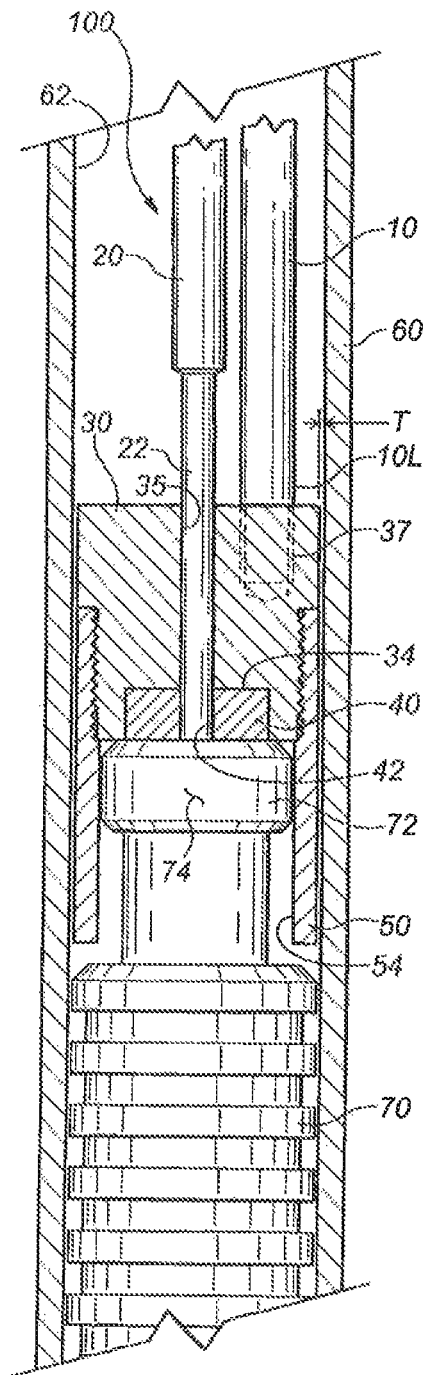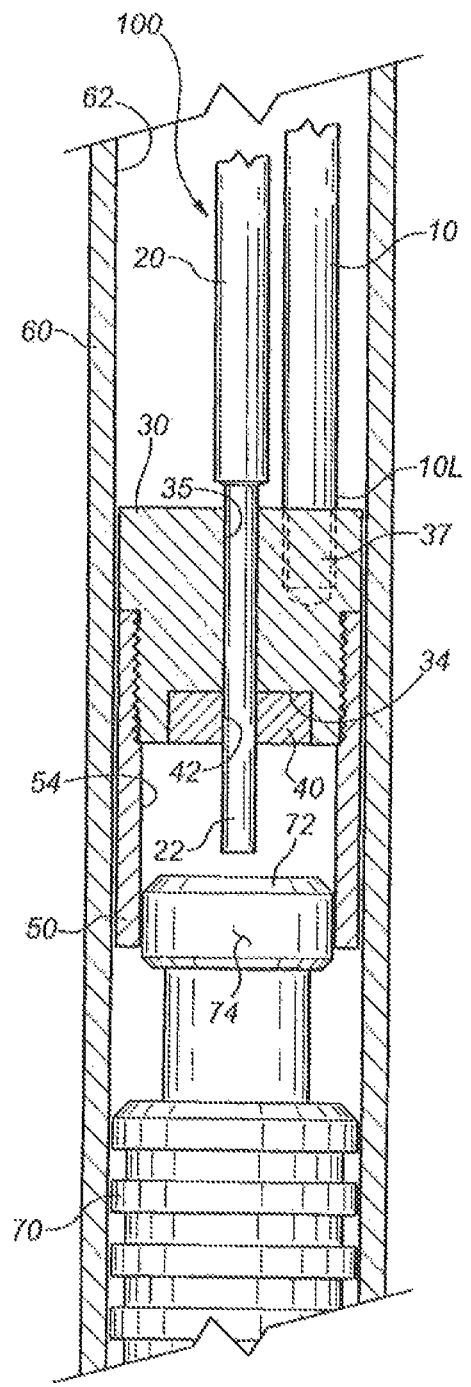

MAGNETIC INSTALLATION AND RETRIEVAL TOOL FOR FLUID LIFT PLUNGERS

FIELD OF THE DISCLOSURE

The present disclosure relates in general to fluid lift plungers used to remove accumulated liquids from natural gas wells, and in particular to apparatus for installing a fluid lift plunger into the lubricator section of a natural gas wellhead or retrieving a plunger from the lubricator.

BACKGROUND

Natural gas is commonly found in subsurface geological formations such as deposits of granular material (e.g., sand or gravel) or porous rock. Production of natural gas from such formations typically involves drilling a wellbore to a desired depth within the formation, installing a casing in the wellbore (to keep the wellbore from sloughing and collapsing), perforating the casing in the production zone (i.e., the portion of the well that penetrates the gas-bearing formation) so that gas can flow from the formation into the casing, and installing a string of production tubing inside the casing down to the production zone. Gas can then flow to the surface through the production tubing.

Formation liquids, including water, oil, and/or hydrocarbon condensates, are typically present with natural gas in a subsurface reservoir. If the formation pressure (i.e., the pressure of the fluids flowing into the well from the formation) is high enough, it will lift the liquids with the natural gas, and the liquids can be separated from the gas in a separator facility at the surface. However, the formation pressure reduces as more gas is produced from the well, and may eventually become insufficient to lift the liquids. Liquids therefore accumulate in the well and in the production tubing, and since the density of the liquids is much higher than the density of natural gas, the hydrostatic pressure exerted by the column of liquid in the well exceeds the reduced formation pressure, thus preventing the flow of gas from the formation into the well. The well is then said to be "liquid loaded".

Although the well may be liquid loaded, the formation pressure may still be sufficient to lift gas to the surface if the accumulated liquid in the well can be removed, and one well-known way to do that is by using a fluid lift plunger inserted into the production tubing to facilitate intermittent production from the well. Fluid lift plungers come in many different styles. In general terms, however, a fluid lift plunger can be described as a generally cylindrical body, typically made of steel, and having an outer diameter slightly smaller than the inner diameter of the production tubing; i.e., such that the plunger can move freely up and down within the tubing, and will gradually fall by gravity through any liquid that has accumulated in the tubing, but tight enough against the tubing wall to allow the plunger to support and lift a column of liquid without any significant amount of the liquid bypassing the plunger and dropping back down the tubing.

To use a plunger lift system in a liquid loaded well, a plunger is inserted into the production tubing and allowed to drop through the accumulated liquid to the bottom of the tubing. The well is then closed in (by closing a shut-off valve on the tubing at the wellhead), thereby allowing pressure in the well to build up; even though the formation pressure may have become partially depleted, it will still gradually pressurize the well, because the well has no means for pressure relief while it is closed in. When the wellbore pressure has built up to a level sufficient to overcome the hydrostatic pressure of the accumulated liquids, the well can be opened up (by opening the shut-off valve) to begin a production cycle. The plunger, sitting at the bottom of the column of liquid in the production tubing, thus becomes exposed to the built-up wellbore pressure, which forces the plunger upward, lifting the liquid column with it.

When the column (or "slug") of liquid reaches the wellhead, it is drawn off through a production flow line above the shut-off valve, while the plunger continues upward into a "lubricator", which is essentially an extension of the production tubing extending above the flow line. With the liquid thus removed from the production tubing, thereby relieving the hydrostatic pressure on the formation, the well has been "unloaded". Gas can once again be produced up the tubing until such time as the formation pressure drops and the well becomes liquid loaded again, whereupon the process can be repeated by re-inserting the plunger and closing off the well to let the wellbore pressure build up again.

The lubricator serves as a receiver for the plunger when it arrives at the surface after the well has been opened up. A lubricator typically incorporates a spring-loaded "bumper" or other means at its upper end for cushioning the arrival of the plunger, which can be moving upward quite fast by the time it reaches the lubricator. As well, the lubricator will incorporate a "catcher" which prevents the plunger from falling back down the tubing, and which allows the well operator to retrieve the plunger. One common type of catcher comprises a spring-loaded member (conventionally referred to as a "bullet") that projects into the bore of the receiver but is readily displaced radially outward when contacted by the upward-travelling plunger, thereby allowing the plunger to continue its upward travel. The spring-loaded bullet immediately moves back into the lubricator bore. When the plunger reaches the end up its upward travel (usually by hitting the cushioning spring), it drops down and rests on the bullet. An end cap at the upper end of the lubricator can now be removed to allow retrieval of the plunger for examination and servicing as required.

When the time comes to open a closed-in well and begin a new production cycle, the plunger is re-inserted into the lubricator so that it rests on the bullet, and the end cap is tightened onto the upper end of the lubricator. The shut-off valve is opened, and the bullet is retracted from the lubricator bore (by means of an external actuator) to allow the plunger to drop down past the shut-off valve into the production tubing.

Many examples of lubricators, plunger "bumpers" and catchers can be found in the prior art; see, for example, U.S. Pat. Nos. 6,148,923 and 6,705,404.

For a number of reasons, lubricators commonly extend several feet above the catcher. One reason for this is to accommodate different types of plungers, the lengths of which can vary significantly. In any event, it is common for the upper end of a plunger, resting on or in the catcher, to be disposed a considerable distance below the top of the lubricator, thus making it difficult to retrieve the plunger. The upper end of a typical plunger is formed with a heavy cylindrical flange commonly called a "fishing neck", with a diameter smaller than the main body of the plunger so that it can be grasped (either manually or with a "fishing" tool of some type) to retrieve or "fish" the plunger from the lubricator. However, this is not always easy to do when the plunger is sitting well down into the lubricator.

Installation of a plunger into a lubricator must also be done with care to prevent damage to wellhead components. Particularly in the case of a wellhead having a comparatively long lubricator, a heavy plunger that is simply dropped into the lubricator from a significant height above the catcher can displace or pass through the catcher and then impact the shut-off valve, causing physical damage to the catcher or the valve or both. Accordingly, it is desirable to insert a plunger into a lubricator in a manner that sets the plunger onto the catcher with minimal vertical force, so that the catcher will not be displaced or damaged in the process.

For the foregoing reasons, there is a need for improved tools for inserting a fluid lift plunger into the lubricator on a gas wellhead and for retrieving the plunger from the lubricator.

BRIEF SUMMARY OF THE DISCLOSURE

The present disclosure teaches embodiments of a plunger installation and retrieval tool incorporating a magnet that magnetically engages the upper end of a steel fluid lift plunger and supports the plunger during installation and retrieval into or from a lubricator. The tool includes release means for exerting a force against the plunger to break the magnetic bond and thus release the plunger from the tool. The magnet will preferably be a rare earth (e.g., neodymium) magnet, but other types of magnets (including electromagnets) could be used in alternative embodiments.

In a first embodiment, the plunger installation and retrieval tool comprises a magnet holder having a generally cylindrical outer surface and a pocket formed into the lower end of the magnet holder for receiving a magnet. The diameter of the cylindrical outer surface is preferably only slightly smaller than the inside diameter of the lubricator in which it is intended to use the tool. An elongate hanger member is connected to the upper end of the magnet holder and extends upward to connect to a hanger support, which may be provided in the form of a circular or rectilinear plate, or a member of any other suitable configuration.

The tool also comprises an actuating mechanism providing means for breaking the magnetic bond between a plunger and the magnet, in order to release the plunger from the tool. In one embodiment, the actuating mechanism comprises a rigid elongate actuating member (alternatively referred to as a plunger release rod) having an upper end retained by the hanger support such that the plunger release rod is longitudinally movable relative to the hanger support within a preset travel range. The upper end of the actuator member is preferably provided with a handle of any suitable design to facilitate operation of the tool. The lower end of the actuator member is slidingly disposed within an actuator channel passing longitudinally through the magnet holder. The actuator channel may pass through the magnet disposed within the pocket in the magnet holder. Alternatively, the actuator channel may pass through the magnet holder at a location radially outboard of the magnet. When the actuator member is moved to the upper limit of its preset travel range, its lower end will be retracted within the magnet holder. When the actuator member is moved to the lower limit of its travel range, its lower end will extend below the bottom of the magnet holder.

In an alternative embodiment, the actuating mechanism comprises a flexible elongate actuating member (such as a cable or a solid rod) encased within a flexible housing or sheath. Although being flexible, the sheath has sufficient strength and stiffness such that a compressive force can be applied to the actuating member notwithstanding its flexibility similar to the well-known "Bowden cable" commonly used to actuate throttles and chokes on internal combustion engines, and to actuate hand brakes on bicycles and motorcycles. The embodiment has the advantage of being more compact than embodiments using rigid elongate actuating members, the length of which will be determined by tool's required operating range (i.e., the distance from the top of the lubricator to the top of a plunger within the lubricator). As well, a flexible actuating member allows an operator to use the tool from a less elevated position relative to the lubricator, thus enhancing operator safety.

To install a plunger into a lubricator on a gas wellhead using the tool, the actuator member is raised to retract its lower end into the magnet holder, and then the tool is manipulated such that the magnet engages the top of the fishing neck at the upper end of the plunger. With the plunger thus magnetically supported by the tool, it is lowered into the upper end of the lubricator until the plunger is resting on the catcher inside the lubricator. A downward force is then applied to the plunger release rod (i.e., by moving the handle of the plunger release rod downward toward the hanger support), thereby pressing the lower end of the plunger release rod against the top of the plunger to break the magnetic bond and release the plunger from the magnet. The tool is then withdrawn from the lubricator.

In a second and particularly preferred embodiment, a lower region of the cylindrical outer surface of the magnet holder is threaded to receive a cylindrical member (or "fishing neck skirt") extending a desired distance below the lower end of the magnet holder. The outer diameter of the skirt is preferably only slightly smaller than the inside diameter of the lubricator in which the tool is to be used, while the inner diameter of the skirt is only slightly larger than the diameter of the fishing neck of the plunger with which the tool is to be used. The fishing neck skirt thus acts as stabilizer keeping the plunger axially aligned with the tool such that the upper end of the plunger remains in full contact engagement with the magnet and will not be dislodged by lateral forces that might be inadvertently exerted against the plunger or the tool during plunger installation or retrieval.

This second embodiment provides the further advantage of making it possible to use the same tool in lubricators having different inner diameters, and with plungers having fishing necks of different diameters. The outer diameter of the magnet holder can be set to suit the smallest anticipated lubricator diameter, and a variety of skirts can be provided that can all be threaded onto the magnet holder but have different inner and outer diameters to accommodate different combinations of fishing neck size and lubricator size.

BRIEF DESCRIPTION OF THE DRAWINGS

Embodiments will now be described with reference to the accompanying figures, in which numerical references denote like parts, and in which:

FIG. 1 is an isometric view of a plunger installation and retrieval tool in accordance with a first embodiment, shown with the plunger release rod in a retracted position.

FIG. 2 is an isometric view of the plunger installation and retrieval tool in FIG. 1, shown with the plunger release rod in an extended position.

FIG. 3 is an isometric view of the lower portion of a plunger installation and retrieval tool in accordance with a second embodiment, having a removable fishing neck skirt and with the plunger release rod located coaxially with the magnet holder.

FIG. 4 is an isometric view of the lower portion of a variant of the plunger installation and retrieval tool in FIG. 3, the plunger release rod passing through the magnet holder radially outboard of the magnet.

FIG. 5 is a longitudinal cross-section through the plunger installation and retrieval tool in FIG. 3, shown inserted into a lubricator with the fishing neck of a plunger magnetically suspended from the tool and stabilized by the tool's fishing neck skirt.

FIG. 6 is a longitudinal cross-section as in FIG. 5, but showing the plunger released from the tool subsequent to actuation of the plunger release rod.

DETAILED DESCRIPTION

Figure 7:
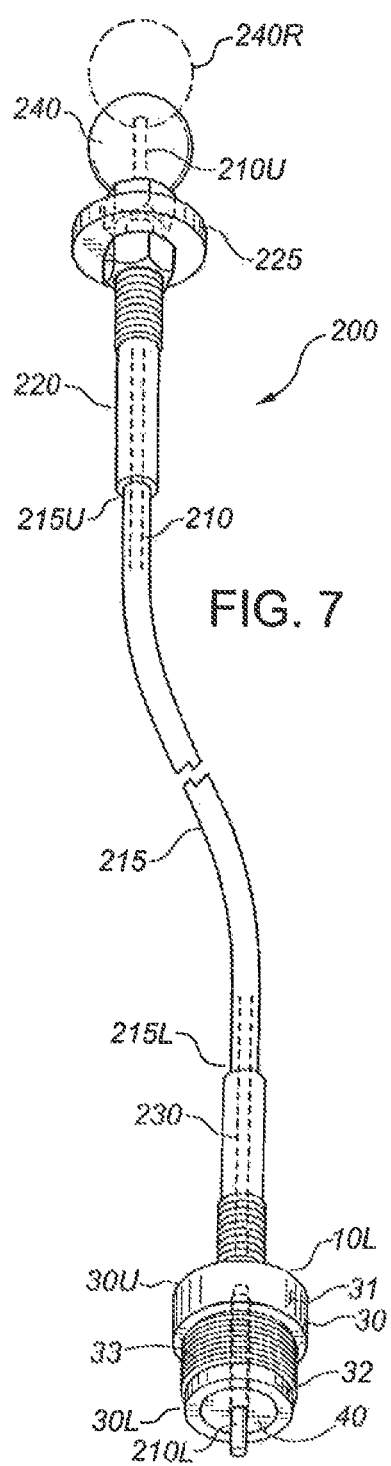
FIG. 7 is an isometric view of a plunger installation and retrieval tool in accordance with a third embodiment, in which the plunger release mechanism incorporates a flexible plunger release rod encased in a flexible housing.

FIGS. 1-3 and 5-6 illustrate a plunger installation and retrieval tool 100 in accordance with a first embodiment. Tool 100 comprises a magnet holder 30 having an upper end 30U, a lower end 30L, a generally cylindrical outer surface 31, a pocket 34 formed into lower end 30L of magnet holder 30, and a magnet 40 disposed within pocket 34. Magnet 40 preferably has a lower surface 41 which preferably (but not necessarily) is planar to facilitate optimally effective magnetic engagement with the upper end of a plunger. Although magnet 40 is shown with its lower surface 41 flush with lower end 30L of magnet holder 30, magnet 40 may optionally project below magnet holder 30.

An elongate hanger rod 10 has a lower end 10L connected to upper end 30U of magnet holder 30 (for example, by means of a threaded connection 37) and an upper end 10U connected to a hanger support 14, shown in the Figures, by way of example only, as a circular plate. Whatever form hanger support 14 may take, it will preferably be large enough to prevent tool 100 from accidentally falling completely into a lubricator.

Tool 100 also includes an elongate plunger release rod 20 having an upper end 20U retained by hanger support 14 such that plunger release rod 20 can move longitudinally relative to hanger support 14 within a preset travel range. In the illustrated embodiments, upper end 20U of plunger release rod 20 is provided with a handle 26 to facilitate actuation of tool 100. Handle 26 is shown, by way of example, in the form of a ball-like knob, but it could take any of many different functionally-effective forms (including a simple 90-degree bend in rod 20).

In the illustrated embodiment, longitudinal movement of plunger release rod 20 relative to hanger rod 10 is facilitated by slidably disposing plunger release rod 20 through an opening 16 in hanger support 14. However, alternative embodiments may use other means for facilitating this movement without departing from the scope of the present disclosure. Tool 100 preferably incorporates means for limiting the longitudinal travel of plunger release rod 20 relative to hanger rod 10, and any functionally suitable means of doing so may be used without departing from the scope of the present disclosure. By way of non-limiting example, upward longitudinal travel of plunger release rod 20 relative to hanger rod 10 is limited by a first stop element 12 fixed to hanger rod 10 at a selected location along its length, and a second stop element 24 fixed to plunger release rod 20 at a selected location below first stop element 12 on hanger rod 10, with first and second stop elements 12 and 24 being configured such that second stop element 24 cannot move upward past first stop element 12. Downward longitudinal travel of plunger release rod 20 relative to hanger rod 10 is limited in the illustrated embodiments by handle 26 contacting hanger support 14.

In FIGS. 1 and 2, magnet holder 30 is shown having an externally-threaded lower section 33 and, optionally, an unthreaded section 32 between threaded section 33 and lower end 30L of magnet holder 30. However, this is not essential; in alternative embodiments, unthreaded cylindrical outer surface 31 of magnet holder 30 could extend the full length between upper and lower ends 30U and 30L of magnet holder 30. However, preferred embodiments will include threaded section 33 to facilitate connection of a cylindrical skirt 50 as shown in FIGS. 3 and 4. As illustrated, skirt 50 has an upper threaded section 52 for threaded engagement with threaded section 33 of magnet holder 30, and a lower section having a cylindrical bore 54 below threaded section 52. The diameter of cylindrical bore 54 will preferably be selected to provide a reasonably close-tolerance sliding fit over the fishing neck 72 of a gas lift plunger 70, as illustrated in FIGS. 5 and 6.

In the embodiment shown in FIGS. 1-3, plunger release rod 20 is coaxial with magnet holder 30, with hanger rod 10 being generally parallel to plunger release rod 20 but radially offset from it. A lowermost section 22 of plunger release rod 20 is slidably disposed within a coaxial bore 35 in magnet holder 30 and a coaxial bore 42 through magnet 40. FIG. 4 illustrates a variant in which hanger rod 10 is coaxially mounted to magnet holder 30, with plunger release rod 20 being radially offset. In this embodiment, the force by plunger release rod 20 to release plunger 70 from magnet 40 will be offset, but this variant avoids the need to drill or otherwise form a bore 42 in magnet 40 for sliding passage of plunger release rod 20 (or lowermost section 22 thereof, in the illustrated embodiments). This is advantageous because an offset bore 35' can be drilled through the full length of a variant magnet holder 30' as shown in FIG. 4. Magnet holder 30' (or 30) will typically and preferably be machined from mild steel, which is readily drillable, whereas materials such as neodymium are difficult and costly to drill. Accordingly, the embodiment in FIG. 4 allows the use of an undrilled magnet 40', which will be less costly than magnet 40 having a bore 42 as in FIG. 3.

The operation and use of plunger installation and retrieval tool 100 may be readily understood with reference to FIGS. 5 and 6, which show a tool 100 in accordance with FIG. 3 disposed within a lubricator 60 having an inner cylindrical surface 62. In the illustrated embodiment, the outer diameter of skirt 50 matches the diameter of cylindrical outer surface 31 of magnet holder 30, and is slightly less than the diameter of lubricator inner surface 62 to provide a small tolerance gap T between skirt 50 and magnet holder 30 and lubricator inner surface 62. However, this is not essential; as previously noted, in variants of the illustrated embodiment, the diameter of magnet holder 30 could be less than the diameter of skirt 50, with tolerance gap T being formed only between skirt 50 and lubricator inner surface 62.

In FIG. 5, lowermost section 22 of plunger release rod 20 is fully retracted into magnet 40 and magnet holder 30, and the upper end of plunger 70 is in flush contact with lower surface 41 of magnet 40, such that plunger 70 is magnetically suspended from magnet 40. The fishing neck 72 of plunger 70 is fully inserted into skirt 50, with the cylindrical outer surface 74 of fishing neck 72 snugly constrained by a tolerance fit against cylindrical bore 54 of skirt 50. FIG. 5 thus illustrates the condition existing when plunger 70 is being inserted into lubricator 60 before it is released from magnet 40, or the condition existing just after tool 100 has magnetically engaged plunger 70 for purposes of removing plunger 70 from lubricator 60.

FIG. 6 illustrates the operation of tool 100 to release plunger 70, such when setting plunger 70 onto a catcher (not shown) within lubricator 60. The person operating tool 100, while grasping hanger support 14, applies a downward force to handle 26 and plunger release rod 20, thereby urging the lower end of plunger release rod 20 downward against the top of plunger 70 to break the magnetic bond between magnet 40 and plunger 70. The downward force applied to handle 26 is reacted by hanger support 14 being grasped by the user. Tool 100 may then be withdrawn from lubricator 60.

Tool 100 may optionally be provided with biasing means for biasing handle 26 and plunger release rod 20 toward a retracted position as shown in FIGS. 1 and 5, thereby to facilitate engagement of magnet 40 with a plunger 70.

Figure 8:
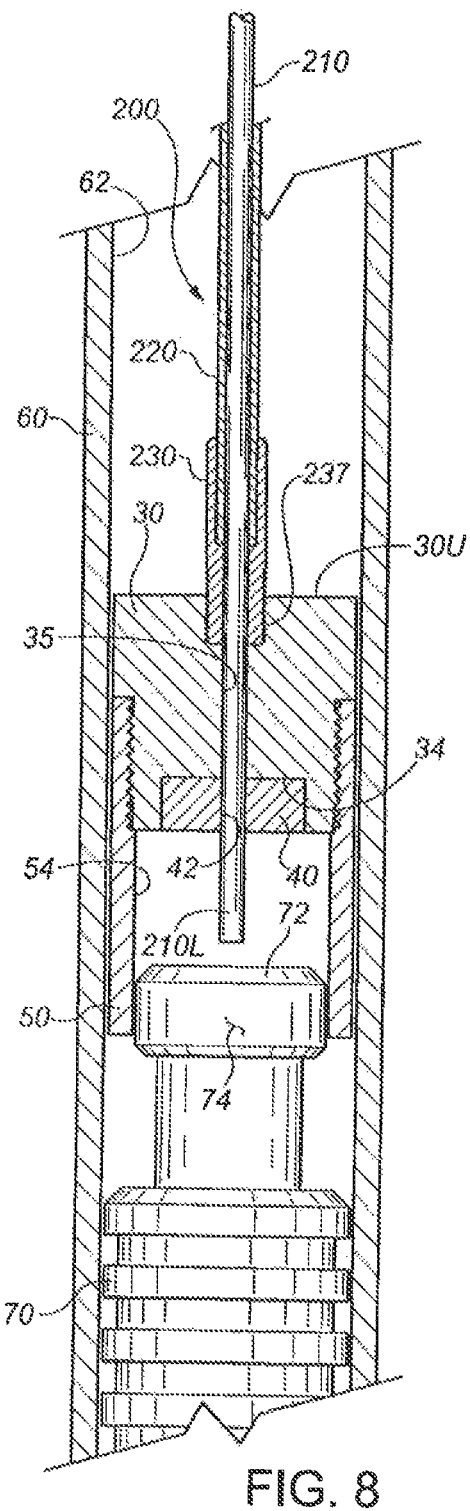
FIG. 8 is an isometric view of the plunger installation and retrieval tool in FIG. 7, shown with the plunger release rod in an extended position.

FIGS. 7 and 8 illustrate a plunger installation and retrieval tool 200 in accordance with an alternative embodiment in which the tool actuating mechanism comprises a flexible elongate actuating member 210 encased within a flexible sheath 215 (which functions in part like hanger rod 10 of tool 100). As shown in FIG. 7, the upper end 215U of sheath 215 is anchored to a suitable reaction member 225 (analogous to hanger support 14 of tool 100) by means of a suitable upper adapter 220. Similarly, the lower end 215L of sheath 215 is anchored to upper end 30U of magnet holder 30 in conjunction with a suitable lower adapter 230 (shown by way of example in FIG. 8 as a sleeve connected to magnet holder 30 by means of a threaded connection 237). Flexible actuating member 210 extends through reaction member 225 and its upper end 210U is anchored to a suitable handle 240. The lower end 210L of flexible actuating member 210 is slidably disposed within bore 35 in magnet holder 30 and bore 42 in magnet 40, such that lower end 210L can (similar to lower section 22 of plunger release rod 20 in other illustrated embodiments). Flexible actuating member 210 fits closely within sheath 215, which laterally restrains flexible actuating member 210 such that a compressive force can be applied to it without buckling.

Operation of tool 200 is essentially the same as for the embodiments of tool 100 shown in FIGS. 1-6. To release a plunger 70 that is in magnetic engagement with magnet 40, a downward force is applied to handle 260 (i.e., toward reaction member 225) such that lower end 210L of flexible actuating member 210 exerts a force against the top of plunger 70 to break its magnetic bond with magnet 40, all as shown in FIGS. 7 and 8. Handle 260 can then be pulled upward to a retracted position 240R (indicated in broken outline in FIG. 7) so that lower end 210L of actuating member 210 is fully retracted into magnet 40 and magnet holder 30, thereby readying tool 200 for re-use to set or retrieve a plunger.

Graphite or other suitable lubricating material may be introduced into sheath 215 to facilitate easy movement of actuating member 210 within sheath 215. Tool 200 may optionally be provided with biasing means for biasing handle 240 and actuating member 210 toward a retracted position, thereby to facilitate engagement of magnet 40 with a plunger 70.

It will be readily appreciated by those skilled in the art that various modifications of the present invention may be devised without departing from the scope and teaching of the present invention, including modifications using equivalent structures or materials hereafter conceived or developed. For example, lowermost section 22 of plunger release rod 20 is shown as being of reduced diameter relative to the main portion of plunger release rod 20, but this is not essential; in alternative embodiments, plunger release rod 20 could be of uniform size throughout its length. Although plunger release rod 20 is shown as a round rod, plunger release rod 20 could be provided in other forms without departing from the scope of the present disclosure. In all illustrated embodiments, magnet 40 and magnet pocket 34 in magnet holder 30 are shown as being of cylindrical configuration, but this is by way of non-limiting example only; other shapes and configurations of magnet 40 and magnet pocket 34 may be used in variant embodiments of tool 100.

It is to be especially understood that the invention is not intended to be limited to any described or illustrated embodiment, and that the substitution of a variant of a claimed element or feature, without any substantial resultant change in the working of the invention, will not constitute a departure from the scope of the invention. It is also to be appreciated that the different teachings of the embodiments described and discussed herein may be employed separately or in any suitable combination to produce desired results.

In this patent document, any form of the word "comprise" is to be understood in its non-limiting sense to mean that any item following such word is included, but items not specifically mentioned are not excluded. A reference to an element by the indefinite article "a" does not exclude the possibility that more than one such element is present, unless the context clearly requires that there be one and only one such element. Any use of any form of the terms "connect", "engage", "couple", "attach", or any other term describing an interaction between elements is not meant to limit the interaction to direct interaction between the subject elements, and may also include indirect interaction between the elements such as through secondary or intermediary structure. Relational terms such as "parallel", "perpendicular", "coincident", "intersecting", and "equidistant" are not intended to denote or require absolute mathematical or geometrical precision. Accordingly, such terms are to be understood as denoting or requiring substantial precision only (e.g., "substantially parallel") unless the context clearly requires otherwise. As used in this document, the terms "typical" and "typically" are used in the sense of representative or common usage or practice, and are not to be understood as implying essentiality or invariability.

What is claimed is:

1. A plunger installation and retrieval tool for installing a fluid lift plunger in a tubular lubricator on a gas wellhead, said tool comprising:
    a plunger support assembly comprising:
        a magnet holder having an upper end, a lower end, and a cylindrical side surface and defining a pocket extending upward from said lower end;
        a magnet having a lower surface, said magnet being disposed within said pocket such that said lower surface is proximal to or lower than the lower end of the magnet holder;
        a cylindrical skirt carried by a lower portion of the plunger support assembly, the cylindrical skirt being non-retractable and projecting below the lower surface of the magnet, the cylindrical skirt having a cylindrical bore sized to receive an upper portion of the fluid lift plunger and to prevent lateral and pivoting movement of the fluid lift plunger, and the magnet being encircled within the cylindrical bore;
    an elongate hanger having a lower end connected to the plunger support assembly and an upper end connected to a hanger support member; and
    an elongate actuating member having a lower portion slidably disposed with a longitudinal bore extending through the plunger support assembly, and an upper portion longitudinally movable relative to the hanger support member;

such that when a fluid lift plunger is magnetically engaged by the magnet, a downward force applied to the upper end of the actuating member will urge the lower end of the actuating member downward against the plunger, thereby breaking a magnetic bond between the magnet and the plunger.

2. The plunger installation and retrieval tool according to claim 1 wherein the magnet comprises a neodymium magnet.

3. The plunger installation and retrieval tool according to claim 2, wherein the hanger comprises a flexible sheath and the actuating member comprises a flexible member slidably disposed within the sheath.

4. The plunger installation and retrieval tool according to claim 1, wherein the longitudinal bore extends through the magnet holder.

5. The plunger installation and retrieval tool according to claim 4, wherein the hanger comprises a flexible sheath and the actuating member comprises a flexible member slidably disposed within the sheath.

6. The plunger installation and retrieval tool according to claim 1, wherein the longitudinal bore extends through the magnet holder and the magnet.

7. The plunger installation and retrieval tool according to claim 1, wherein the hanger comprises a rigid rod and the actuating member comprises a rigid rod.

8. The plunger installation and retrieval tool according to claim 1, wherein the hanger comprises a flexible sheath and the actuating member comprises a flexible member slidably disposed within the sheath.

9. The plunger installation and retrieval tool according to claim 1, wherein the skirt is removable from the plunger support assembly.

10. The plunger installation and retrieval tool according to claim 1, wherein the skirt is removable from the plunger support assembly by a threaded connection.

11. The plunger installation and retrieval tool according to claim 1, wherein the actuation member is biased toward a retracted position in which the lower end of the actuation member is fully retracted into the plunger support assembly.

12. The plunger installation and retrieval tool according to claim 1, wherein the longitudinal bore extends through the magnet holder.

13. The plunger installation and retrieval tool according to claim 12, wherein the hanger comprises a rigid rod and the actuating member comprises a rigid rod.

14. The plunger installation and retrieval tool according to claim 1, wherein the hanger comprises a flexible sheath and the actuating member comprises a flexible member slidably disposed within the sheath.

* * * * *